US012260821B2

(12) United States Patent
Kim et al.

(10) Patent No.: US 12,260,821 B2
(45) Date of Patent: Mar. 25, 2025

(54) DISPLAY DEVICE

(71) Applicant: LG Display Co., Ltd., Seoul (KR)

(72) Inventors: Mingyu Kim, Paju-si (KR); JoonKi Kim, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/392,128

(22) Filed: Dec. 21, 2023

(65) Prior Publication Data

US 2024/0221649 A1 Jul. 4, 2024

(30) Foreign Application Priority Data

Dec. 29, 2022 (KR) ........................ 10-2022-0188782

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2310/0294* (2013.01); *G09G 2320/0219* (2013.01)

(58) Field of Classification Search
CPC ............... G09G 3/3241; G09G 3/3291; G09G 2300/0426; G09G 2300/0842; G09G 2310/027; G09G 2330/021; G09G 2300/0819; G09G 2300/0861; G09G 2310/0262; G09G 2320/0673; G09G 2330/022; G09G 2340/0435; G09G 2300/0852; G09G 2370/08; G09G 3/3225; G09G 2300/043; G09G 2320/0247;

(Continued)

(56) References Cited

U.S. PATENT DOCUMENTS 6,774,877 B2 8/2004 Nishitoba et al.
7,315,292 B2 1/2008 Yamashita
8,552,948 B2 10/2013 Miyake et al.

(Continued)

FOREIGN PATENT DOCUMENTS

CN 1534573 A 10/2004
CN 105513540 A 4/2016

(Continued)

OTHER PUBLICATIONS

The Japan Patent Office, Office Action, Japanese Patent Application No. 2023-220347, Dec. 17, 2024, six pages.

(Continued)

*Primary Examiner* — Md Saiful A Siddiqui
(74) *Attorney, Agent, or Firm* — Fenwick & West LLP

(57) ABSTRACT

A display device includes: a substrate; a plurality of sub pixels on the substrate; a light-emitting element on a sub pixel; and a pixel circuit on the sub pixel and comprising: a driving transistor including a gate electrode having a dual gate structure, a source electrode, and a drain electrode, the driving transistor connected between a high-potential power line and the light-emitting element; and a capacitor connected between the high-potential power line and a node between the source electrode and the drain electrode of the driving transistor. The capacitor may reduce the variation in voltage between the gate electrode and the source electrode of the driving transistor.

19 Claims, 8 Drawing Sheets

(58) Field of Classification Search
CPC .................... G09G 3/3233; G09G 3/32; G09G 2310/0294; G09G 2320/0219
See application file for complete search history.

(56) References Cited

U.S. PATENT DOCUMENTS

| | | | | |
|---|---|---|---|---|
| 11,688,343 | B2 | 6/2023 | Zheng et al. | |
| 2002/0196212 | A1 | 12/2002 | Nishitoba et al. | |
| 2004/0246202 | A1* | 12/2004 | Yamashita | G09G 3/3258 345/30 |
| 2008/0246717 | A1 | 10/2008 | Miyake et al. | |
| 2010/0033476 | A1 | 2/2010 | Yamamoto et al. | |
| 2010/0289832 | A1 | 11/2010 | Yamamoto et al. | |
| 2019/0189055 | A1 | 6/2019 | Zhang et al. | |
| 2019/0304373 | A1 | 10/2019 | Wang et al. | |
| 2021/0043709 | A1* | 2/2021 | Kim | G09G 3/3266 |
| 2021/0193780 | A1 | 6/2021 | Diao et al. | |
| 2021/0312866 | A1 | 10/2021 | Fan et al. | |
| 2022/0148517 | A1 | 5/2022 | Kim et al. | |
| 2022/0262882 | A1 | 8/2022 | Guo et al. | |
| 2022/0310733 | A1 | 9/2022 | Kim | |
| 2023/0067920 | A1* | 3/2023 | Kim | G09G 3/3291 |
| 2023/0154402 | A1 | 5/2023 | Zheng et al. | |
| 2023/0200129 | A1* | 6/2023 | Zheng | H10K 59/131 257/40 |
| 2024/0196650 | A1 | 6/2024 | Kobayashi et al. | |

FOREIGN PATENT DOCUMENTS

| | | | |
|---|---|---|---|
| CN | 107316614 | A | 11/2017 |
| CN | 115035853 | A | 9/2022 |
| JP | 2008-134625 | A | 6/2008 |
| JP | 2010-266490 | A | 11/2010 |
| KR | 10-2003-0004048 | A | 1/2003 |
| KR | 10-2021-0058179 | A | 5/2021 |
| TW | 200907891 | A | 2/2009 |
| TW | 202244884 | A | 11/2022 |
| WO | WO 2022/160535 | A1 | 8/2022 |

OTHER PUBLICATIONS

Intellectual Property Office of the United Kingdom, Combined Search and Examination Report, United Kingdom Patent Application No. GB2319537.3, Oct. 8, 2024, 11 pages.
Taiwan Intellectual Property Office, Office Action, Taiwanese Patent Application No. 112149809, Nov. 11, 2024, 10 pages.

* cited by examiner

DISPLAY DEVICE

CROSS-REFERENCE TO RELATED APPLICATION

This application claims the priority of Republic of Korea Patent Application No. 10-2022-0188782 filed on Dec. 29, 2022, in the Korean Intellectual Property Office, which is hereby incorporated by reference in its entirety.

BACKGROUND

Field

The present disclosure relates to a display device, and more particularly, to a display device capable of coping with a bright spot defect.

Description of the Related Art

As display devices used for a monitor of a computer, a television (TV) set, a mobile phone, and the like, there are an organic light-emitting display (OLED) configured to autonomously emit, and a liquid crystal display (LCD) that requires a separate light source.

The range of application of the display devices is diversified from the monitor of the computer and the TV set to personal mobile devices, and studies are being conducted on the display devices having wide display areas and having reduced volumes and weights.

Meanwhile, the display device includes a plurality of sub pixels that is minimum units constituting a screen. The plurality of sub pixels each includes a light-emitting element, and a driving transistor for operating the light-emitting element. However, there may be characteristic deviations between the driving transistors of the plurality of sub pixels, or the brightness of the sub pixels may be non-uniform because of the degradation of the light-emitting elements. Therefore, a plurality of transistors and a plurality of capacitors may be added to the plurality of sub pixels to internally sense and compensate for the deviations between the sub pixels.

SUMMARY

An object to be achieved by the present disclosure is to provide a display device that reduces the variation in node voltage between a source electrode and a drain electrode of a driving transistor caused by a kick-back phenomenon when a switching transistor is turned off.

Another object to be achieved by the present disclosure is to provide a display device that reduces the variation in voltage between a gate and a source of a driving transistor caused by a kick-back phenomenon during a holding period.

Still another object to be achieved by the present disclosure is to provide a display device that reduces a flow of leakage current from a driving transistor during a holding period.

Yet another object to be achieved by the present disclosure is to provide a display device that reduces the variation in voltage of a gate electrode of a driving transistor and reduces a bright spot defect caused by the variation in voltage.

Objects of the present disclosure are not limited to the above-mentioned objects, and other objects, which are not mentioned above, can be clearly understood by those skilled in the art from the following descriptions.

In one embodiment, a display device comprises: a substrate; a plurality of sub pixels on the substrate: a light-emitting element on a sub pixel from the plurality of sub pixels; and a pixel circuit on the sub pixel and configured to operate the light-emitting element, the pixel circuit comprising: a driving transistor including a gate electrode having a dual gate structure, a source electrode, and a drain electrode, the driving transistor connected between a high-potential power line and the light-emitting element: and a capacitor connected between the high-potential power line and a node between the source electrode and the drain electrode of the driving transistor. Therefore, the capacitor may be provided to mitigate the variation in voltage of the fifth node, thereby reducing the variation in voltage between the gate and the source of the driving transistor.

In one embodiment, a display device comprises: a substrate; a plurality of sub pixels on the substrate; a light-emitting element on a sub pixel from the plurality of sub pixels; and a pixel circuit on the sub pixel and configured to operate the light-emitting element, the pixel circuit comprising: a driving transistor including an active layer, a gate electrode over the active layer, and a source electrode and a drain electrode that are electrically connected to the active layer, the driving transistor connected between a high-potential power line and the light-emitting element: and a capacitor including a first capacitor electrode connected to the high-potential power line and a second capacitor electrode connected to a node between the source electrode and the drain electrode of the driving transistor, the first capacitor electrode overlapping a portion of the active layer.

Other detailed matters of the exemplary embodiments are included in the detailed description and the drawings.

The present disclosure may reduce the variation in voltage of the gate electrode of the driving transistor caused by the kick-back phenomenon when the switching transistor is turned off.

The present disclosure may reduce the variation in drive current supplied from the driving transistor to the light-emitting element.

The present disclosure may reduce the variation in voltage between the gate and the source of the driving transistor during the holding period.

The present disclosure may reduce the decrease in voltage of the gate electrode of the driving transistor during the holding period.

The present disclosure may reduce a bright spot defect during the light-emitting period by minimizing the variation in voltage of the gate electrode of the driving transistor during the holding period.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
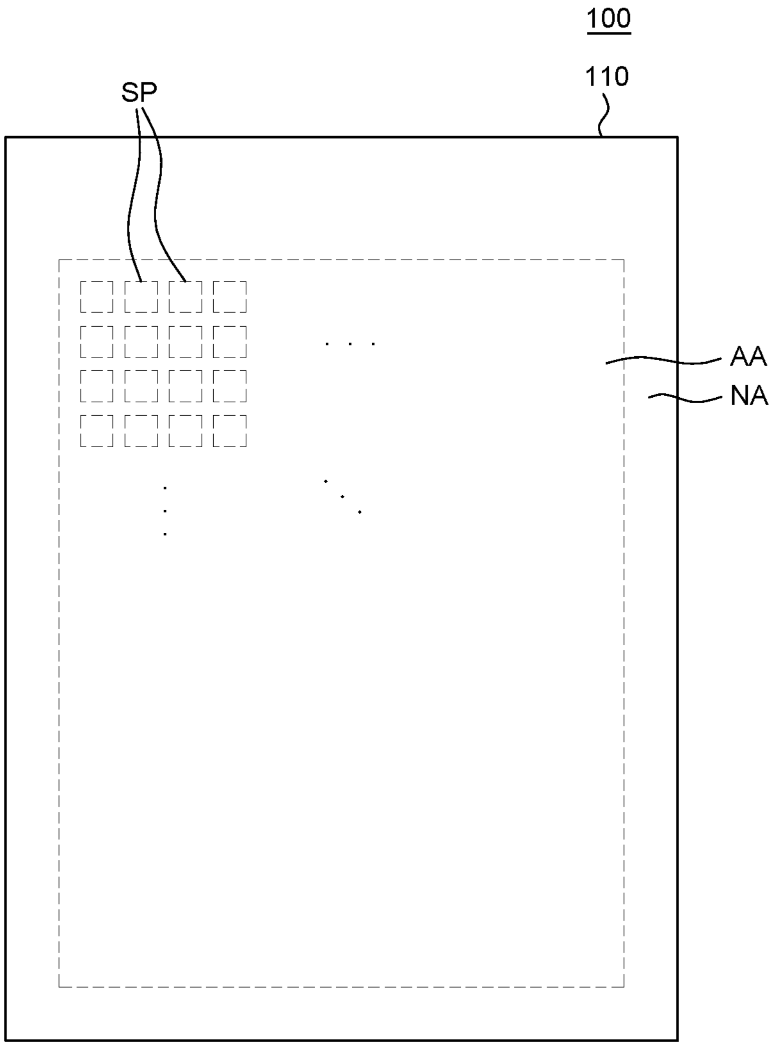
FIG. 1 is a top plan view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a top plan view of a display device according to an exemplary embodiment of the present disclosure. For convenience of description, FIG. 1 illustrates a substrate 110 and a plurality of sub pixels SP among various constituent elements of a display device 100.

The substrate 110 is a component for supporting various constituent elements included in the display device 100 and may be made of an insulating material. For example, the substrate 110 may be made of glass, resin, or the like. In addition, the substrate 110 may include plastic such as polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), or cyclic olefin copolymer (COC), triacetylcellulose (TAC) film, polyvinyl alcohol (PVA) film, and polystyrene (PS) and may be made of a material having flexibility.

The substrate 110 includes a display area AA and a non-display area NA.

The display area AA is an area in which the plurality of sub pixels SP are disposed to display images. Each of the plurality of sub pixels SP is an individual unit configured to emit light. A light-emitting element and a pixel circuit may be formed on each of the plurality of sub pixels SP. The light-emitting element may vary depending on the type of display device 100. For example, in a case in which the display device 100 is an organic light-emitting display device, the light-emitting element may be an organic light-emitting element including an anode, an organic layer, and a cathode. In addition, micro-light-emitting diodes (LED) and quantum-dot light-emitting diodes (QLEDs) including quantum dots (QDs) may be further used for the light-emitting elements. A light emitting element may also be implemented based on an inorganic light emitting diode.

The non-display area NA is an area in which no image is displayed. The non-display area NA is adjacent to the display area AA. More specifically, the non-display area NA is adjacent to the display area AA to enclose the display area AA. Various lines, drive ICs, and the like for operating the sub pixels SP disposed in the display area AA are disposed. For example, various drive ICs, such as a gate driver IC and a data driver IC, and various drive circuits may be disposed in the non-display area NA. Meanwhile, the non-display area NA may be positioned on a rear surface of the substrate 110, i.e., a surface on which the sub pixel SP is not present. Alternatively, the non-display area NA may be excluded. However, the present disclosure is not limited to the configuration illustrated in the drawings.

Hereinafter, the plurality of sub pixels SP will be described in more detail with reference to FIGS. 2 and 3.

Figure 2:
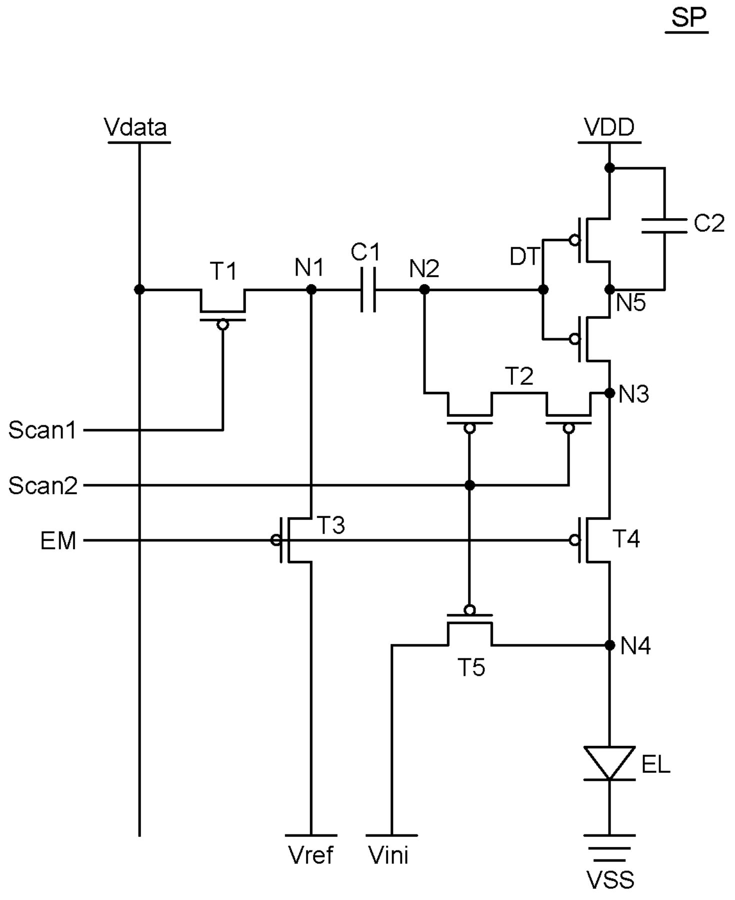
FIG. 2 is a circuit diagram of a sub pixel of the display device according to the exemplary embodiment of the present disclosure.

FIG. 2 is a circuit diagram of a sub pixel of the display device according to the exemplary embodiment of the present disclosure. FIG. 3 is a driving timing diagram of the sub pixel of the display device according to the exemplary embodiment of the present disclosure.

With reference to FIG. 2, the plurality of sub pixels SP each includes a light-emitting element EL, and a pixel circuit configured to operate the light-emitting element EL. The pixel circuit includes a first transistor T1, a second transistor T2, a third transistor T3, a fourth transistor T4, a fifth transistor T5, a driving transistor DT, a first capacitor C1, and a second capacitor C2, which can be called a "6T2C" structure since six transistors and two capacitors are included. Embodiments of the present disclosure are not limited to this. For example, more transistor or capacitor may be included, or some transistor or capacitor may be omitted or combined with other ones.

Further, the plurality of sub pixels SP are each connected to a first scan line which supplies a first scan signal Scan1, a second scan line which supplies a second scan signal Scan2, a data line which supplies a data voltage Vdata, a light-emitting control line which supplies a light-emitting control signal EM, a reference line which supplies a reference voltage Vref, an initialization line which supplies an initialization voltage Vini, a high-potential power line which supplies a high-potential power voltage VDD, and a low-potential power line which supplies a low-potential power voltage VSS.

Meanwhile, the plurality of transistors of the plurality of sub pixels SP may be configured as different types of transistors. For example, one of the plurality of transistors may be a transistor having an active layer made of an oxide semiconductor. Because the oxide semiconductor has a low off-current, the oxide semiconductor is suitable for the switching transistor having a short turn-on time and a long turn-off time.

As another example, another of the plurality of transistors may be a transistor having an active layer made of low-temperature polysilicon (LTPS). Because the polysilicon has high mobility, low power consumption, and excellent reliability, the polysilicon may be suitable for the driving transistor.

Further, the plurality of transistors may each be an N-type transistor or a P-type transistor. In the case of the N-type transistor, carriers are electrons, such that the electrons may flow from the source electrode to the drain electrode, and the electric current may flow from the drain electrode to the source electrode. In the case of the P-type transistor, carriers are positive holes, such that the positive holes may flow from the source electrode to the drain electrode, and the electric current may flow from the source electrode to the drain electrode. For example, one of the plurality of transistors may be the N-type transistor, and another of the plurality of transistors may be the P-type transistor.

Hereinafter, the description will be made on the assumption that the plurality of transistors are P-type transistors. However, the present disclosure is not limited thereto.

First, the first transistor T1 includes a gate electrode, a source electrode, and a drain electrode. The gate electrode of the first transistor T1 is connected to the first scan line, and the source electrode and the drain electrode is connected between the data line and a first node N1. The first transistor T1 may be turned on by a first scan signal Scan1 with a low level and transmit a data voltage Vdata to the first node N1.

The second transistor T2 includes a gate electrode, a source electrode, and a drain electrode. The gate electrode of the second transistor T2 is connected to the second scan line, and the source electrode and the drain electrode are respectively connected to a second node N2 and a third node N3. In one embodiment, the second transistor T2 has dual-gate structure as shown in FIG. 2. The second transistor T2 may be turned on by a second scan signal Scan2 with a low level and electrically connect together the second node N2 and the third node N3. Therefore, the driving transistor DT may be subjected to diode connection by the turned-on second transistor T2 and sense a threshold voltage of the driving transistor DT.

The third transistor T3 includes a gate electrode, a source electrode, and a drain electrode. The gate electrode of the third transistor T3 is connected to the light-emitting control line (e.g., an emission line), and the source electrode and the drain electrode are connected to the reference line and the first node N1. The third transistor T3 may be turned on by a light-emitting control signal EM with a low level and transmit a reference voltage Vref to the first node N1.

The fourth transistor T4 includes a gate electrode, a source electrode, and a drain electrode. The gate electrode of the fourth transistor T4 is connected to the light-emitting control line, the source electrode is connected to the third node N3, and the drain electrode is connected to a fourth node N4. The fourth transistor T4 may be turned on by the light-emitting control signal EM with a low level, electrically connect the third node N3 and the fourth node N4, and transmit a drive current to the light-emitting element EL.

The fifth transistor T5 includes a gate electrode, a source electrode, and a drain electrode. The gate electrode of the fifth transistor T5 is connected to the second scan line, the source electrode is connected to the initialization line, and the drain electrode is connected to the fourth node N4. The fifth transistor T5 may be turned on by the second scan signal Scan2 with a low level and transmit an initialization voltage Vini to the fourth node N4.

The driving transistor DT may include a gate electrode, a source electrode, and a drain electrode. The gate electrode of the first driving transistor DT is connected to the second node N2, the source electrode is connected to the high-potential power line, and the drain electrode is connected to the third node N3. In one embodiment, the first driving transistor DT has dual-gate structure as shown in FIG. 2. The driving transistor DT may control the drive current to be applied to the light-emitting element in response to a gate-source voltage Vgs.

The first capacitor C1 includes a plurality of first capacitor electrodes. A first one of the first capacitor electrodes may be connected to the first node N1, and a second one of the first capacitor electrodes may be electrically connected to the gate electrode of the driving transistor DT or the second node N2. The first capacitor C1 may be charged with the data voltage Vdata to which the threshold voltage of the driving transistor DT is applied, such that the voltage of the gate electrode of the driving transistor DT may be constantly maintained for one frame.

The second capacitor C2 includes a plurality of second capacitor electrodes. A first one of the second capacitor electrodes is connected to the high-potential power line, and a second one of the second capacitor electrodes is connected to a fifth node N5. The second capacitor may reduce the variation in voltage of the gate electrode of the driving transistor DT when the second transistor T2 is turned off or on. A more detailed description will be described below with reference to FIGS. 5 to 7B.

The light-emitting element EL includes an anode and a cathode. The anode of the light-emitting element EL is connected to the fourth node N4, and the cathode is connected to the low-potential power line to which a low-potential power voltage VSS is supplied. Therefore, the light-emitting element EL may emit light on the basis of the drive current transmitted from the driving transistor DT to the anode.

Figure 3:
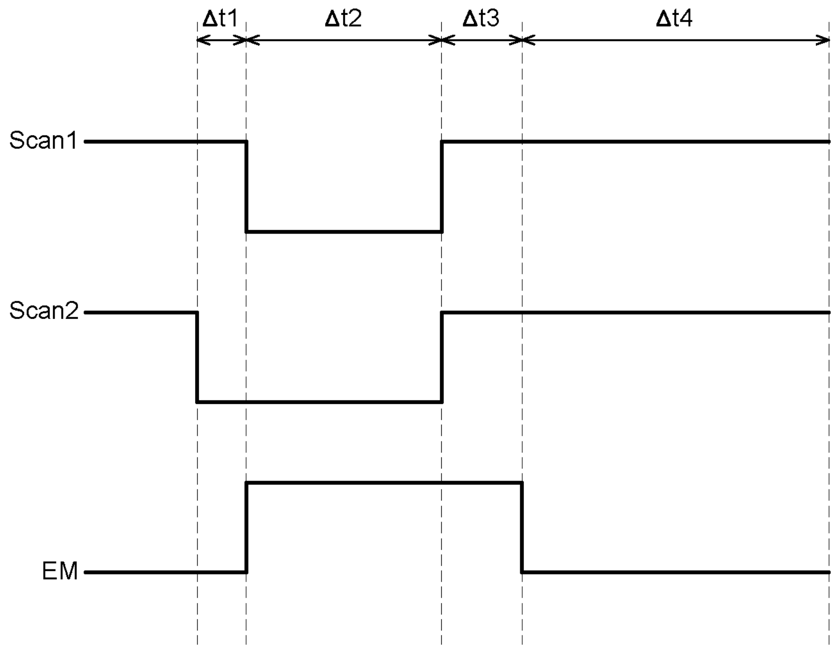
FIG. 3 is a driving timing diagram of the sub pixel of the display device according to the exemplary embodiment of the present disclosure.

With reference to FIG. 3, the sub pixel SP may operate in the order of a first period Δt1, a second period Δt2, a third period Δt3, and a fourth period Δt4. The first period Δt1 may be an initialization period, the second period Δt2 may be a sampling period that is after the initialization period, the third period Δt3 may be a holding period that is after the sampling period, and the fourth period Δt4 may be a light-emitting period that is after the sampling period.

First, during the first period Δt1 that is the initialization period, the light-emitting control signal EM with the low level may be outputted from the light-emitting control line, the first scan signal Scan1 with the high level is outputted to the first scan line, and the second scan signal Scan2 with the low level is outputted to the second scan line, such that the second transistor T2, the third transistor T3, the fourth transistor T4, and the fifth transistor T5 are turned on, and the first transistor T1 is turned off. The first node N1 may be initialized by the reference voltage Vref by means of the turned-on third transistor T3, and the fourth node N4 may be initialized by the initialization voltage Vini by means of the turned-on fifth transistor T5. Further, the initialization voltage Vini transmitted to the fourth node N4 may be transmitted to the third node N3 and the second node N2 through the turned-on fourth transistor T4 and the turned-on second transistor T2, such that the third node N3 and the second node N2 may also be initialized by the initialization voltage Vini. Therefore, during the first period Δt1, the voltage at each of the nodes may be initialized.

Next, during the second period Δt2 that is the sampling period, the first scan signal Scan1 with the low level is outputted to the first scan line, the light-emitting control signal EM with the high level is outputted to the light-emitting control line, and the second scan signal Scan2 with the low level is outputted to the second scan line. The first transistor T1 may be turned on by the first scan signal Scan1 with the low level and transmit the data voltage Vdata to the first node N1. Further, the light-emitting control signal EM with the high level may be outputted, such that the third transistor T3 and the fourth transistor T4 may be turned off. Lastly, the driving transistor DT may be brought into a diode connection state by the turned-on second transistor T2, and a differential voltage between a high-potential power voltage VDD and the threshold voltage may be sampled and supplied to the second node N2. Therefore, for the second period Δt2, the threshold voltage of the driving transistor DT may be sensed, the fifth transistor T5 may be turned on and the light-emitting element EL may be initialized.

Next, during the third period Δt3 that is the holding period, the first scan signal Scan1 with the high level is outputted to the first scan line, and the second scan signal Scan2 with the high level is outputted to the second scan line, such that the first transistor T1, the second transistor T2, and the fifth transistor T5 may be turned off, and the light-emitting control signal EN with the high level is outputted to the light-emitting control line, such that the third transistor T3 and the fourth transistor T4 may be turned off. During the third period Δt3, the data voltage Vdata, which has been inputted previously during the second period Δt2, may be maintained by a storage capacitor. The third period Δt3 is a period that provides a time difference between the second period Δt2 and the fourth period Δt4, which is the light-emitting period, so that the second period Δt2 and the fourth period Δt4 do not overlap.

Lastly, during the fourth period Δt4 that is the light-emitting period, the light-emitting control signal EM with the low level is outputted to the light-emitting control line. The reference voltage Vref may be applied to the first node N1 through the turned-on third transistor T3, and the voltage of the first node N1 may be a differential voltage between the reference voltage Vref and the data voltage Vdata, the second node N2 is connected to the first node N1 via the first capacitor C1, such that the variation in voltage may be adopted to the second node N2. During the fourth period Δt4, the gate-source voltage Vgs of the driving transistor DT may be set to a value (Vdata-Vref+Vth) made by subtracting the reference voltage Vref from the data voltage Vdata and adding the threshold voltage Vth, thereby controlling the drive current. Further, the light-emitting element EL may emit light by supplying the drive current to the light-emitting element EL from the driving transistor DT through the turned-on fourth transistor T4.

Meanwhile, in the display device 100 according to the exemplary embodiment of the present specification, the driving transistor DT may be configured as a transistor having a dual gate structure in which a pair of gates are disposed over an active layer ACT, such that a bright spot defect caused by the off-current in the driving transistor DT may be reduced.

Figure 4:
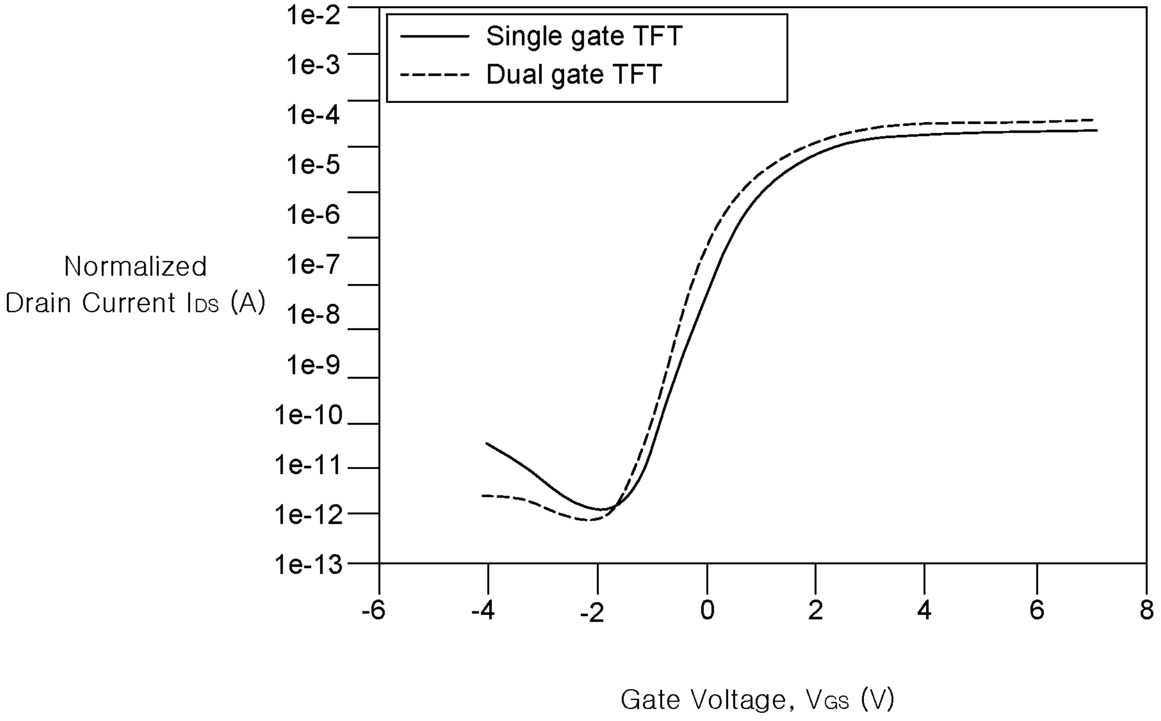
FIG. 4 is a graph illustrating a comparison between off-currents of a transistor of a single gate structure and a transistor of a dual gate structure according to the exemplary embodiment of the present disclosure.

FIG. 4 is a graph illustrating a comparison between off currents of a transistor of a single gate structure and a transistor of a dual gate structure.

First, the electric current may finely flow in the transistor in a turned-off state. That is, the off-current may flow when the transistor is in the turned-off state. The off-current may cause a situation in which an image is displayed with brightness higher than brightness to be displayed by the sub pixel SP or a bright spot defect in which the sub pixel SP, which need not emit light, emits light.

With reference to FIG. 4, it can be ascertained that the electric current finely flows even in an area with a voltage lower than −2 V in case that the transistor is turned off at about −2 V. Further, it can be ascertained that the off-current is lower overall in a transistor having a dual gate structure having two gate electrodes than the off-current in a transistor having a single gate structure having a single gate electrode.

Because the electric current is controlled by the two gate electrodes in the transistor having the dual gate structure, it is possible to more easily control the flow of the electric current in comparison with the transistor having the single gate structure and configured to control the electric current using the single gate electrode. In addition, in the transistor having the dual gate structure, a pair of channels is formed in an active layer, and the number of junction parts, i.e., the number of junction parts, which are junction surfaces between a channel area and a source area and a drain area of the active layer, may increase. For example, a non-doped area between the source electrode and the drain electrode of the active layer and a doped area are additionally joined, such that the number of junction parts may increase. In this case, the leakage current may occur because of a carrier that is tunneled as a deficiency area produced by an electric field applied to the junction part increases. Therefore, in the transistor having the dual gate structure, the intensity of the electric field applied to the junction part may decrease as the number of junction parts increases. In particular, the intensity of the electric field applied to the junction part of the drain area connected to the drain electrode may decrease, which may decrease the deficiency area and decrease the leakage current caused by the tunneled carrier. Therefore, in comparison with the transistor having the single gate structure, the off-current may be reduced in the transistor having the dual gate structure.

Therefore, in the display device 100 according to the exemplary embodiment of the present disclosure, the driving transistor DT may be configured as the transistor having the dual gate structure, such that the leakage current may be reduced, and the bright spot defect may be reduced.

Meanwhile, as the driving transistor DT has the dual gate structure, the fifth node N5 may be formed between the source electrode and the drain electrode of the driving transistor DT. However, the voltage at the periphery of the second transistor T2 may fluctuate because of a kick-back phenomenon when the second transistor T2 is turned off. For example, the voltage of the fifth node N5 between the source electrode and the drain electrode of the driving transistor DT may fluctuate. For example, in case that the second transistor T2 is the P-type transistor, the peripheral voltage may fluctuate while increasing when the second transistor T2 is turned off. Further, the second node N2 adjacent to the fifth node N5 is coupled to the fifth node N5, which may cause a problem in which the voltage may fluctuate, and the leakage current may flow. Therefore, in the display device 100 according to the exemplary embodiment of the present disclosure, the second capacitor C2 is added, which may reduce the variation in voltage of the fifth node N5 and the variation in voltage of the second node N2.

Figure 5:
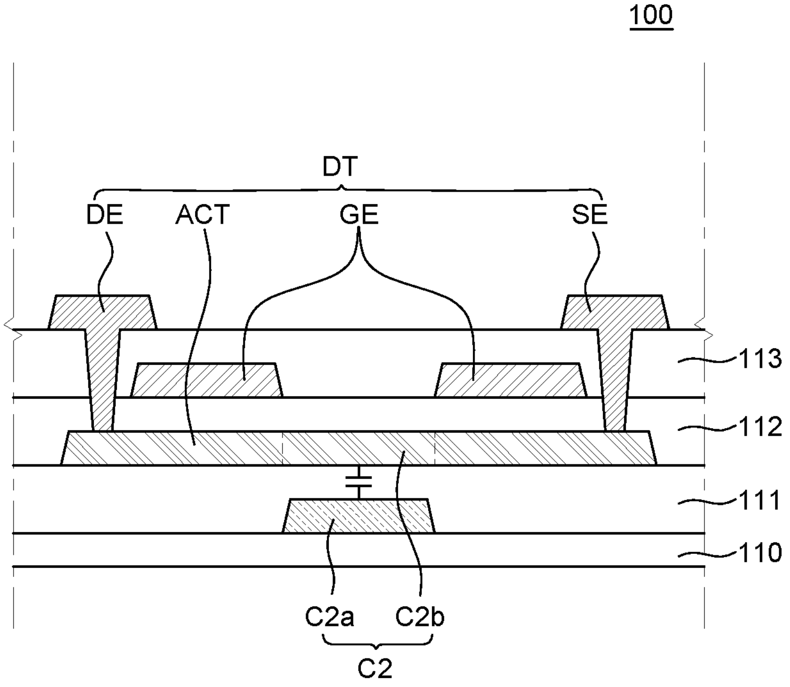
FIG. 5 is a schematic cross-sectional view of the display device according to the exemplary embodiment of the present disclosure.
Figure 6:
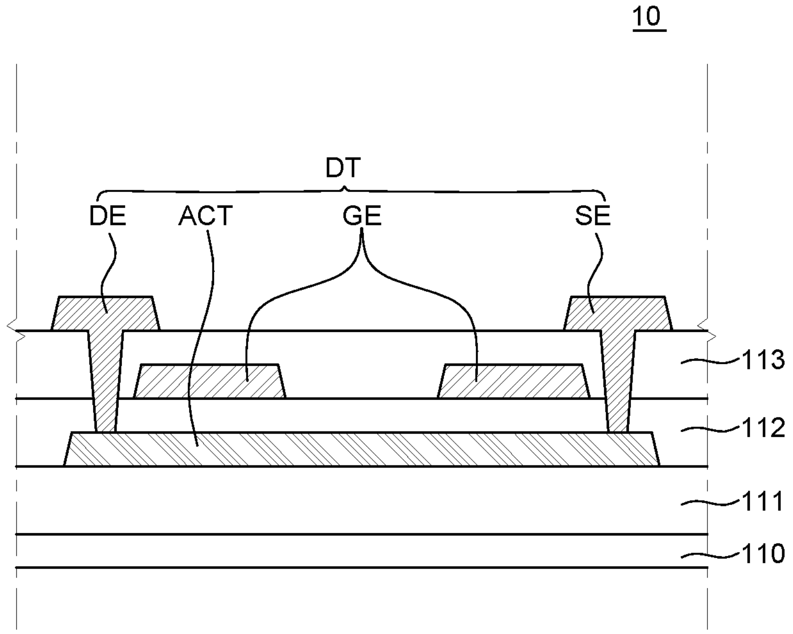
FIG. 6 is a schematic cross-sectional view of a display device according to a comparative example.
Figure 7A:
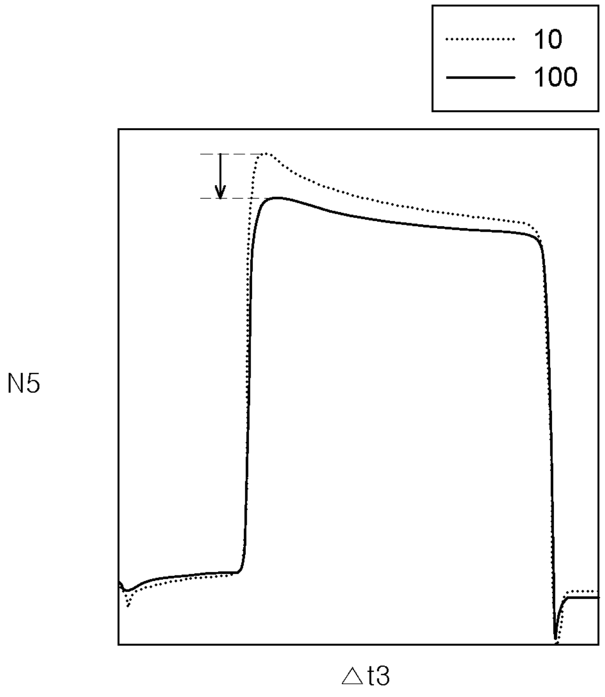
FIG. 7A is a waveform diagram illustrating changes in voltage of fifth nodes of display devices according to the comparative example and the exemplary embodiment of the present disclosure.
Figure 7B:
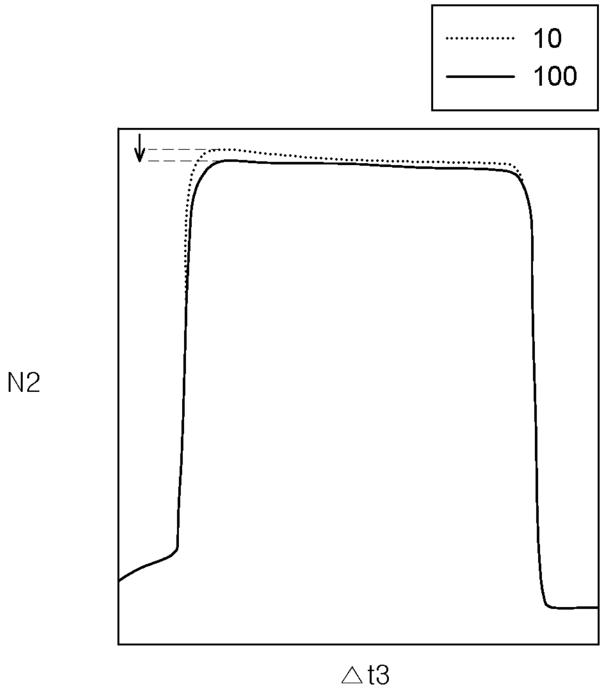
FIG. 7B is a waveform diagram illustrating changes in voltage of second nodes of the display devices according to the comparative example and the exemplary embodiment of the present disclosure.

FIG. 5 is a schematic cross-sectional view of the display device according to the exemplary embodiment of the present disclosure. FIG. 6 is a schematic cross-sectional view of a display device according to a comparative example. FIG. 7A is a waveform diagram illustrating changes in voltage of the fifth nodes of display devices according to the comparative example and the exemplary embodiment of the present disclosure. FIG. 7B is a waveform diagram illustrating changes in voltage of the second nodes of the display devices according to the comparative example and the exemplary embodiment of the present disclosure. For convenience of description, FIGS. 5 and 6 illustrate a schematic cross-sectional structure of the driving transistor DT.

A display device 10 according to the comparative example includes the same configurations of the display device 100 according to the exemplary embodiment of the present specification, except for the second capacitor C2. That is, the sub pixel SP of the display device 10 according to the comparative example includes the first transistor T1, the second transistor T2, the third transistor T3, the fourth transistor T4, the fifth transistor T5, the driving transistor DT, the first capacitor C1, and the light-emitting element EL without the second capacitor C2.

First, with reference to FIG. 5, the display device 100 according to the exemplary embodiment of the present disclosure includes the substrate 110, a buffer layer 111, a gate insulation layer 112, an interlayer insulation layer 113, the driving transistor DT, and the second capacitor C2.

The buffer layer 111 is disposed on the substrate 110. The buffer layer 111 may reduce the penetration of moisture or impurities through the substrate 110. For example, the buffer layer 111 may be configured as a single layer or multilayer made of silicon oxide (SiOx) or silicon nitride (SiNx). However, the present disclosure is not limited thereto. However, the buffer layer 111 may be excluded in accordance with the type of substrate 110 or the type of transistor. However, the present disclosure is not limited thereto.

The driving transistor DT is disposed on the buffer layer 111. The driving transistor DT includes an active layer ACT, a pair of gate electrodes GE (e.g., a plurality of gate electrodes), a source electrode SE, and a drain electrode DE.

The active layer ACT is disposed on the buffer layer 111. The active layer ACT may be made of a semiconductor material such as an oxide semiconductor, amorphous silicon, or polysilicon. The oxide semiconductor material may have an excellent effect of preventing a leakage current and relatively inexpensive manufacturing cost. The oxide semiconductor may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto. The polycrystalline semiconductor material has a fast movement speed of carriers such as electrons and holes and thus has high mobility, and has low energy power consumption and superior reliability. The polycrystalline semiconductor may be made of polysilicon, but is not limited thereto. in addition, the amorphous semiconductor may be made of amorphous silicon (Si). However, the present disclosure is not limited thereto.

The gate insulation layer 112 is disposed on the active layer ACT. The gate insulation layer 112 is an insulation layer for insulating the active layer ACT and the gate electrode GE. The gate insulation layer 112 may be configured as a single layer or multilayer made of silicon oxide (SiOx) or silicon nitride (SiNx) or silicon oxynitride (SiONx). The gate insulating layer 112 may be formed by atomic layer deposition (ALD) method or metal organic chemical vapor deposition (MOCVD). However, the present disclosure is not limited thereto. The active layer ACT connected between the source electrode SE and the drain electrode DE may correspond to the fifth node N5.

The pair of gate electrodes GE is disposed on the gate insulation layer 112. The gate electrodes GE in the pair are spaced apart from each other as shown in FIG. 5. The pair of gate electrodes GE may each be made of an electrically conductive material, for example, copper (Cu), aluminum (Al), molybdenum (Mo), nickel (Ni), titanium (Ti), chromium (Cr), or an alloy thereof. However, the present disclosure is not limited thereto. The pair of gate electrodes GE may correspond to the second node N2.

The interlayer insulation layer 113 is disposed on the pair of gate electrodes GE. Contact holes, through which the source electrode SE and the drain electrode DE are connected to the active layer ACT, are formed in the interlayer insulation layer 113. The interlayer insulation layer 113 may be an insulation layer for protecting components disposed below the interlayer insulation layer 113. The interlayer insulation layer 113 may be configured as a single layer or multilayer made of silicon oxide (SiOx), silicon nitride (SiNx) or silicon oxynitride (SiONx). However, the present disclosure is not limited thereto.

The source electrode SE and the drain electrode DE, which are electrically connected to the active layer ACT, are disposed on the interlayer insulation layer 113. The source electrode SE and the drain electrode DE may each be made of an electrically conductive material, for example, copper (Cu), aluminum (Al), molybdenum (Mo), nickel (Ni), titanium (Ti), chromium (Cr), or an alloy thereof. However, the present disclosure is not limited thereto. In this case, although not illustrated in the drawings, the source electrode SE may be electrically connected to the high-potential power line.

The second capacitor C2 is disposed on the substrate 110. The second capacitor C2 includes a second-first capacitor electrode C2*a* disposed between the substrate 110 and the buffer layer 111, and a second-second capacitor electrode C2*b* disposed on the buffer layer 111. The second-first capacitor electrode C2*a* may be disposed between the substrate 110 and the buffer layer 111 and electrically connected to the high-potential power line. The second-second capacitor electrode C2*b* may be a part of the active layer ACT between the source electrode SE and the drain electrode DE of the driving transistor DT and overlap an area between the pair of gate electrodes GE. That is, the second-second capacitor electrode C2*b* may be integrated with the active layer ACT. Thus, the part of the active layer ACT that constitutes the second-second capacitor electrode C2*b* is non-overlapping with the pair of gate electrodes GE. The second-first capacitor electrode C2*a* may constitute the second capacitor C2 while overlapping the second-second capacitor electrode C2*b* (e.g., a portion of the active layer ACT) with the buffer layer 111 interposed therebetween.

With reference to FIG. 6, the display device 10 according to the comparative example is substantially identical in configuration to the display device 100 according to the exemplary embodiment of the present specification, except that the display device 10 does not include the second capacitor C2. The display device 10 according to the comparative example includes the substrate 110, the buffer layer 111, the gate insulation layer 112, the interlayer insulation layer 113, and the driving transistor DT, but does not include a separate capacitor electrode disposed between the substrate 110 and the buffer layer 111.

Meanwhile, when the switching transistor such as the second transistor T2 is turned off, the voltage of the peripheral node is distorted, which may cause a kick-back phenomenon in which target brightness cannot be outputted. For example, during the third period Δt3 for which the second transistor T2 switches from the turned-on state to the turned-off state, there occurs a problem in that the voltage of the gate electrodes GE of the driving transistor DT fluctuate because of the kick-back phenomenon. Specifically, at the moment when the second transistor T2 comes into the turned-off state, the voltage of the fifth node N5 between the source electrode SE and the drain electrode DE of the driving transistor DT may instantaneously increase to a voltage higher than the high-potential power voltage VDD.

In this case, the voltage of the fifth node N5 becomes higher than the high-potential power voltage VDD, and the leakage current flows from the fifth node N5 toward the high-potential power line, such that the voltage of the fifth node N5 may fluctuate while decreasing. The voltage at the source electrode side may be increased by the leakage current, and the gate-source voltage Vgs of the driving transistor DT may increase, which may eventually cause a bright spot defect.

Further, because the fifth node N5, i.e., the area between the source electrode SE and the drain electrode DE of the driving transistor DT is an area adjacent to the gate electrode GE of the driving transistor DT, the voltage of the gate electrodes GE or the second node N2 may also fluctuate. The fifth node N5 and the second node N2 may be disposed adjacent to each other to constitute a kind of capacitor. The fifth node N5 and the second node N2 are coupled, such that the voltage of the second node N2 may fluctuate in accordance with the variation in voltage of the fifth node N5.

The third period Δt3, for which the voltage of the fifth node N5 fluctuates, is a period for which the data voltage Vdata, which has been applied previously during the second period Δt2, needs to be maintained. However, the variation in voltage of the fifth node N5 and the variation in voltage of the second node N2 coupled to the fifth node N5 may cause a defect in which brightness of light emitted from the sub pixel SP further increases than designed or a bright spot defect occurring when the sub pixel SP, which need not emit light, emits light.

With reference to FIG. 7A, in the display device 10 according to the comparative example, the voltage of the fifth node N5 may be increased by the kick-back phenomenon at the moment when the third period Δt3, for which the second transistor T2 is turned off, starts. Further, the voltage of the fifth node N5 may gradually decrease as the leakage current flows toward the high-potential power line from the fifth node N5 that instantaneously has the voltage higher than the high-potential power voltage VDD. Therefore, because of the kick-back phenomenon, the voltage of the fifth node N5 may instantaneously increase and then gradually decrease. Finally, the voltage of the fifth node N5 may decrease.

With reference to FIG. 7B, the second node N2 adjacent to the fifth node N5 is coupled to the fifth node N5, such that the voltage of the second node N2 may instantaneously increase and then decrease when the third period Δt3 starts. Therefore, when the second transistor T2 is turned off, the voltage of the fifth node N5 fluctuates because of the kick-back phenomenon, and the voltage of the second node N2 coupled to the fifth node N5 also fluctuates, such that the drive current finally flowing during the fourth period Δt4 also varies.

Therefore, the voltage of the fifth node N5 and the voltage of the second node N2 coupled to the fifth node N5 may decrease, such that the gate-source voltage Vgs of the driving transistor DT may increase. The drive current, which is supplied to the light-emitting element EL during the fourth period Δt4, further increases than the drive current designed previously, such that the brightness of the light emitted from the light-emitting element EL further increases than intended to be actually displayed, or the sub pixel SP, which displays low gradations, hardly expresses the low gradations, which may degrade overall display quality.

In contrast, in the display device 100 according to the exemplary embodiment of the present specification, the second capacitor C2 is connected to the fifth node N5, which may reduce the variation in voltage of the fifth node N5 caused by the kick-back phenomenon. The second capacitor C2 connects the fifth node N5 and the high-potential power line that is a stable direct-current power source, which may mitigate the variation in voltage of the fifth node N5 caused by the kick-back phenomenon. That is, the second capacitor C2 connected to the fifth node N5 serves to maintain the voltage of the fifth node N5. Therefore, the second capacitor C2 may allow the gate-source voltage Vgs of the driving transistor DT to be constantly maintained without being increased by the kick-back phenomenon during the third period Δt3.

In comparison with the display device 10 according to the comparative example, in the display device 100 according to the exemplary embodiment of the present specification, it can be ascertained that a range of variation in voltage of the fifth node N5 decreases at the moment when the third period Δt3 starts for which the second transistor T2 is turned off. Further, a range of variation in voltage of the second node N2 may also decrease as the range of variation in voltage of the fifth node N5 decreases. Therefore, in the display device 100 according to the exemplary embodiment of the present specification, the variation in gate-source voltage Vgs of the driving transistor DT may be reduced, such that the drive current, which is previously intended to be supplied to the light-emitting element EL, may be supplied without change. Therefore, the display device 100 according to the exemplary embodiment of the present specification may include the second capacitor C2 configured to reduce the variation in voltage of the fifth node N5, which may reduce the increase in gate-source voltage Vgs of the driving transistor DT caused by the kick-back phenomenon and minimize a bright spot defect caused by the increase in gate-source voltage Vgs of the driving transistor DT.

The exemplary embodiments of the present disclosure can also be described as follows:

According to an aspect of the present disclosure, a display device includes a substrate on which a plurality of sub pixels is defined: a light-emitting element disposed on each of the plurality of sub pixels: and a pixel circuit disposed on each of the plurality of sub pixels and configured to operate the light-emitting element. The pixel circuit includes a driving transistor having a dual gate structure and connected between a high-potential power line and the light-emitting element; and a second capacitor connected between the high-potential power line and a fifth node between a source electrode and a drain electrode of the driving transistor.

The pixel circuit may further include a first transistor connected between a data line and a first node; a first capacitor connected between the first node and a second node connected to a gate electrode of the driving transistor: a second transistor connected between the second node and a third node connected to the drain electrode of the driving transistor; a third transistor connected between the first node and a reference line: a fourth transistor connected between the third node and a fourth node connected to an anode of the light-emitting element; and a fifth transistor connected between the fourth node and an initialization line.

The second transistor and the driving transistor may be a P-type transistor.

The second node and the fifth node may be coupled so that a voltage of the second node varies depending on a variation in voltage of the fifth node.

The pixel circuit may operate in the order of an initialization period, a sampling period, a holding period, and a light-emitting period, the second transistor may be turned on during the sampling period, and the second transistor may be turned off during the holding period.

The second capacitor may be configured to reduce a variation in voltage of the fifth node caused by kick-back when the second transistor is turned off during the holding period.

The second capacitor may be configured to reduce a variation in voltage of the second node during the holding period.

The second capacitor may be configured to constantly maintain a gate-source voltage Vgs of the driving transistor during the holding period.

The second capacitor may include a second-first capacitor electrode and a second-second capacitor electrode that overlap each other. The driving transistor may include an active layer: a pair of gate electrodes disposed on the active layer; and a source electrode and a drain electrode disposed on the pair of gate electrodes and electrically connected to the active layer. The second-first capacitor electrode may be electrically connected to the high-potential power line, and the second-second capacitor electrode may be electrically connected to the active layer.

The display device may further include a buffer layer disposed between the second-first capacitor electrode and the active layer of the driving transistor; and a gate insulation layer disposed between the active layer of the driving transistor and the pair of gate electrodes of the driving transistor. The second-second capacitor electrode may be a part of the active layer that overlaps an area between the pair of gate electrodes of the driving transistor, and the second-second capacitor electrode may constitute the second capacitor while overlapping the second-first capacitor electrode with the buffer layer interposed therebetween.

The pair of gate electrodes may correspond to the second node, and the active layer may correspond to the fifth node.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device comprising:

a substrate;

a plurality of sub pixels on the substrate;

a light-emitting element on a sub pixel from the plurality of sub pixels; and a pixel circuit on the sub pixel and configured to operate the light-emitting element, the pixel circuit comprising:

a driving transistor including an active layer, a pair of gate electrodes on the active layer, and a source electrode and a drain electrode over the pair of gate electrodes and electrically connected to the active layer, wherein the driving transistor connected between a high-potential power line and the light-emitting element; and a capacitor connected between the high-potential power line and a node between the source electrode and the drain electrode of the driving transistor, wherein the capacitor comprises a first capacitor electrode and a second capacitor electrode that overlaps the first capacitor electrode, wherein the first capacitor electrode is electrically connected to the high-potential power line and the second capacitor electrode is electrically connected to the active layer, and wherein the second capacitor electrode is a part of the active layer that is non-overlapping with the pair of gate electrodes of the driving transistor.

2. The display device of claim 1, wherein the pixel circuit further comprises:

a first transistor connected between a data line and a first node;

another capacitor connected between the first node and a second node, the gate electrode of the driving transistor connected to the second node;

a second transistor connected between the second node and a third node, the drain electrode of the driving transistor connected to the third node;

a third transistor connected between the first node and a reference line;

a fourth transistor connected between the third node and a fourth node, an anode of the light-emitting element connected to the fourth node; and a fifth transistor connected between the fourth node and an initialization line.

3. The display device of claim 2, wherein each of the second transistor and the driving transistor is a P-type transistor.

4. The display device of claim 3, wherein the pixel circuit is configured to operate in an order of an initialization period, a sampling period after the initialization period, a holding period after the sampling period, and a light-emitting period after the sampling period, wherein the second transistor is turned on during the sampling period, and the second transistor is turned off during the holding period.

5. The display device of claim 4, wherein in the initialization period, a voltage at the first node is initialized as a voltage supplied through the reference line, and a voltage at each of the second, third and fourth nodes is initialized as a voltage supplied through the initialization line, in the sampling period, a threshold voltage of the driving transistor is sampled and the light-emitting element is initialized, in the holding period, the other capacitor holds a data voltage supplied through the data line, and in the light-emitting period, a driving current is applied to the light-emitting element through the fourth transistor which is turned on.

6. The display device of claim 4, wherein the capacitor reduces the variation of the voltage of the node caused by kick-back responsive to the second transistor being turned off during the holding period.

7. The display device of claim 6, wherein the capacitor reduces a variation in a voltage of the second node during the holding period.

8. The display device of claim 6, wherein the capacitor maintains a gate-source voltage of the driving transistor during the holding period.

9. The display device of claim 2, wherein the first transistor includes a gate electrode connected to a first scan line, the second transistor includes a gate electrode connected to a second scan line, the third transistor includes a gate electrode connected to a light-emitting control line, the fourth transistor includes a gate electrode connected to the light-emitting control line, and the fifth transistor includes a gate electrode connected to the second scan line.

10. The display device of claim 9, wherein the second node and the node are electrically coupled such that a variation of a voltage of the second node depends on a variation of a voltage of the node.

11. The display device of claim 1, further comprising:

a buffer layer between the first capacitor electrode of the capacitor and the active layer of the driving transistor; and a gate insulation layer between the active layer of the driving transistor and the pair of gate electrodes of the driving transistor, wherein the capacitor includes the first capacitor electrode and the second capacitor electrode overlapping the first capacitor electrode with the buffer layer interposed therebetween.

12. The display device of claim 11, wherein the pair of gate electrodes corresponds to the second node, and the active layer corresponds to the node.

13. A display device comprising:

a substrate;

a plurality of sub pixels on the substrate;

a light-emitting element on a sub pixel from the plurality of sub pixels; and a pixel circuit on the sub pixel and configured to operate the light-emitting element, the pixel circuit comprising:

a driving transistor including an active layer, a gate electrode over the active layer, and a source electrode and a drain electrode that are electrically connected to the active layer, the driving transistor connected between a high-potential power line and the light-emitting element; and a capacitor including a first capacitor electrode connected to the high-potential power line and a second capacitor electrode connected to a node between the source electrode and the drain electrode of the driving transistor, the first capacitor electrode overlapping a portion of the active layer, wherein the gate electrode of the driving transistor includes a pair of gate electrodes that are spaced apart from each other and the second capacitor electrode is the portion of the active layer that is overlapped by the first capacitor electrode, and wherein the portion of the active layer that is overlapped by the first capacitor electrode is non-overlapping with the pair of gate electrodes.

14. The display device of claim 13, wherein the portion of the active layer is the node between the source electrode and the drain electrode of the driving transistor.

15. The display device of claim 13, further comprising:

a buffer layer between the first capacitor electrode of the capacitor and the active layer of the driving transistor; and a gate insulation layer between the active layer of the driving transistor and the pair of gate electrodes of the driving transistor.

16. The display device of claim 13, wherein the pixel circuit further comprises:

a first transistor including a source electrode connected to a data line, a drain electrode connected to a first node, and a gate electrode that is connected to a first scan line that supplies a first scan signal;

another capacitor including a first capacitor electrode connected to the first node and a second capacitor electrode connected to a second node, the gate electrode of the driving transistor connected to the second capacitor electrode of the other capacitor at the second node;

a second transistor including a source electrode connected to the second capacitor electrode of the other capacitor and the gate electrode of the driving transistor at the second node, a drain electrode connected to the drain electrode of the driving transistor at a third node, and a gate electrode that is connected to a second scan line that supplies a second scan signal;

a third transistor including a source electrode that is connected to the drain electrode of the first transistor and the first capacitor electrode of the other capacitor at the first node, a drain electrode connected to a reference line that supplies a reference voltage, and a gate electrode connected to an emission line that supplies an emission signal;

a fourth transistor including a source electrode connected to the drain electrode of the second transistor and the drain electrode of the driving transistor at the third node, a drain electrode connected to an anode electrode of the light-emitting element at a fourth node, and a gate electrode that is connected to the gate electrode of the third transistor and the emission line; and a fifth transistor including a source electrode connected to the drain electrode of the fourth transistor and the anode electrode of the light-emitting element at the fourth node, a drain electrode connected to an initialization line that supplies an initiation voltage, and a gate electrode that is connected to the gate electrode of the second transistor and the second scan line.

17. The display device of claim 16, wherein each of the second transistor and the driving transistor is a P-type transistor.

18. The display device of claim 16, wherein the pixel circuit is configured to operate in an order of an initialization period, a sampling period after the initialization period, a holding period after the sampling period, and a light-emitting period after the holding period, wherein the second transistor is turned on during the sampling period, and the second transistor is turned off during the holding period.

19. The display device of claim 18, wherein the capacitor reduces a variation of a voltage of the node between the source electrode and the drain electrode of the driving transistor responsive to the second transistor being turned off during the holding period.

* * * * *